(12) United States Patent
Bailey et al.

(10) Patent No.: US 11,845,419 B2
(45) Date of Patent: Dec. 19, 2023

(54) APPARATUSES, METHODS AND SYSTEMS FOR CONTROLLING VEHICLES WITH ENGINE START-STOP, CYLINDER DEACTIVATION, AND NEUTRAL-AT-STOP CAPABILITIES

(71) Applicant: Cummins Inc., Columbus, IN (US)

(72) Inventors: Benjamin Bailey, Columbus, IN (US); Jennifer K. Light-Holets, Greenwood, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 17/450,586

(22) Filed: Oct. 12, 2021

(65) Prior Publication Data

US 2022/0126815 A1    Apr. 28, 2022

Related U.S. Application Data

(60) Provisional application No. 63/105,434, filed on Oct. 26, 2020.

(51) Int. Cl.
| | | |
|---|---|---|
| *B60W 20/00* | (2016.01) | |
| *B60W 20/16* | (2016.01) | |
| *B60W 30/18* | (2012.01) | |
| *G01C 21/34* | (2006.01) | |
| *B60W 20/20* | (2016.01) | |
| *B60W 20/40* | (2016.01) | |

(52) U.S. Cl.
CPC ............ *B60W 20/16* (2016.01); *B60W 20/20* (2013.01); *B60W 20/40* (2013.01); *B60W 30/18018* (2013.01); *G01C 21/3469* (2013.01)

(58) Field of Classification Search
CPC ...... B60W 20/16; B60W 20/20; B60W 20/40; B60W 30/18018; G01C 21/3469
See application file for complete search history.

(56) References Cited

U.S. PATENT DOCUMENTS

| | | | |
|---|---|---|---|
| 6,494,808 B2 | 12/2002 | Lee | |
| 8,784,264 B2 * | 7/2014 | Gibson | .................... B60K 6/48 |
| | | | 477/76 |
| 9,446,767 B2 | 9/2016 | Hirai et al. | |
| 9,447,747 B2 * | 9/2016 | Gibson | ................. B60W 10/06 |
| 9,650,046 B2 | 5/2017 | Kim et al. | |
| 9,958,059 B2 | 5/2018 | Hu et al. | |
| 10,167,799 B2 | 1/2019 | Serrano et al. | |
| 10,308,252 B2 | 6/2019 | Xu et al. | |
| 10,408,140 B2 | 9/2019 | Yuan et al. | |
| 2015/0298698 A1 | 10/2015 | Kim et al. | |
| 2019/0277206 A1 | 9/2019 | McCarthy et al. | |
| 2019/0323441 A1 | 10/2019 | Yuan et al. | |

\* cited by examiner

*Primary Examiner* — Gonzalo Laguarda
(74) *Attorney, Agent, or Firm* — Taft, Stettinius & Hollister LLP

(57) ABSTRACT

An electronic control system controls operation of a vehicle system by selectably controlling the vehicle system using engine start-stop controls in response to one or more engine start-stop conditions being met, controlling the vehicle system using neutral-at-stop controls in response to one or more neutral-at-stop conditions being met, and controlling the vehicle system using cylinder deactivation controls in response to the one or more neutral-at-stop conditions not being met.

20 Claims, 5 Drawing Sheets

APPARATUSES, METHODS AND SYSTEMS FOR CONTROLLING VEHICLES WITH ENGINE START-STOP, CYLINDER DEACTIVATION, AND NEUTRAL-AT-STOP CAPABILITIES

CROSS-REFERENCE

The present application claims the benefit of and priority to U.S. Application No. 63/105,434, filed Oct. 26, 2020, which is hereby incorporated by reference.

BACKGROUND

The present disclosure relates to vehicle controls for improving fuel economy or reducing fuel consumption and more particularly, but not exclusively, to apparatuses, methods, systems, and techniques for controlling a vehicle with engine start-stop, cylinder deactivation, and neutral-at-stop capabilities. Existing proposals for vehicle controls to improve fuel economy or reduce fuel consumption suffer from a number of drawbacks and shortcomings. There remains a significant unmet need for the unique apparatuses, methods, systems, and techniques disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created and that the invention includes and protects such alterations, modifications, and further applications of the example embodiments as would occur to one skilled in the art.

SUMMARY OF THE DISCLOSURE

Example embodiments include unique methods and systems for controlling an engine operation. In certain embodiments, an electronic control system controls operation of a vehicle system by selectably controlling the vehicle system using engine start-stop (ESS) controls in response to one or more ESS conditions being met, controlling the vehicle system using neutral-at-stop (NAS) controls in response to one or more NAS conditions being met, and controlling the vehicle system using cylinder deactivation (CDA) controls in response to the one or more ESS conditions not being met. Further embodiments, forms, objects, features, advantages, aspects, and benefits shall become apparent from the following description and drawings.

DETAILED DESCRIPTION OF EXAMPLE EMBODIMENTS

Figure 1:
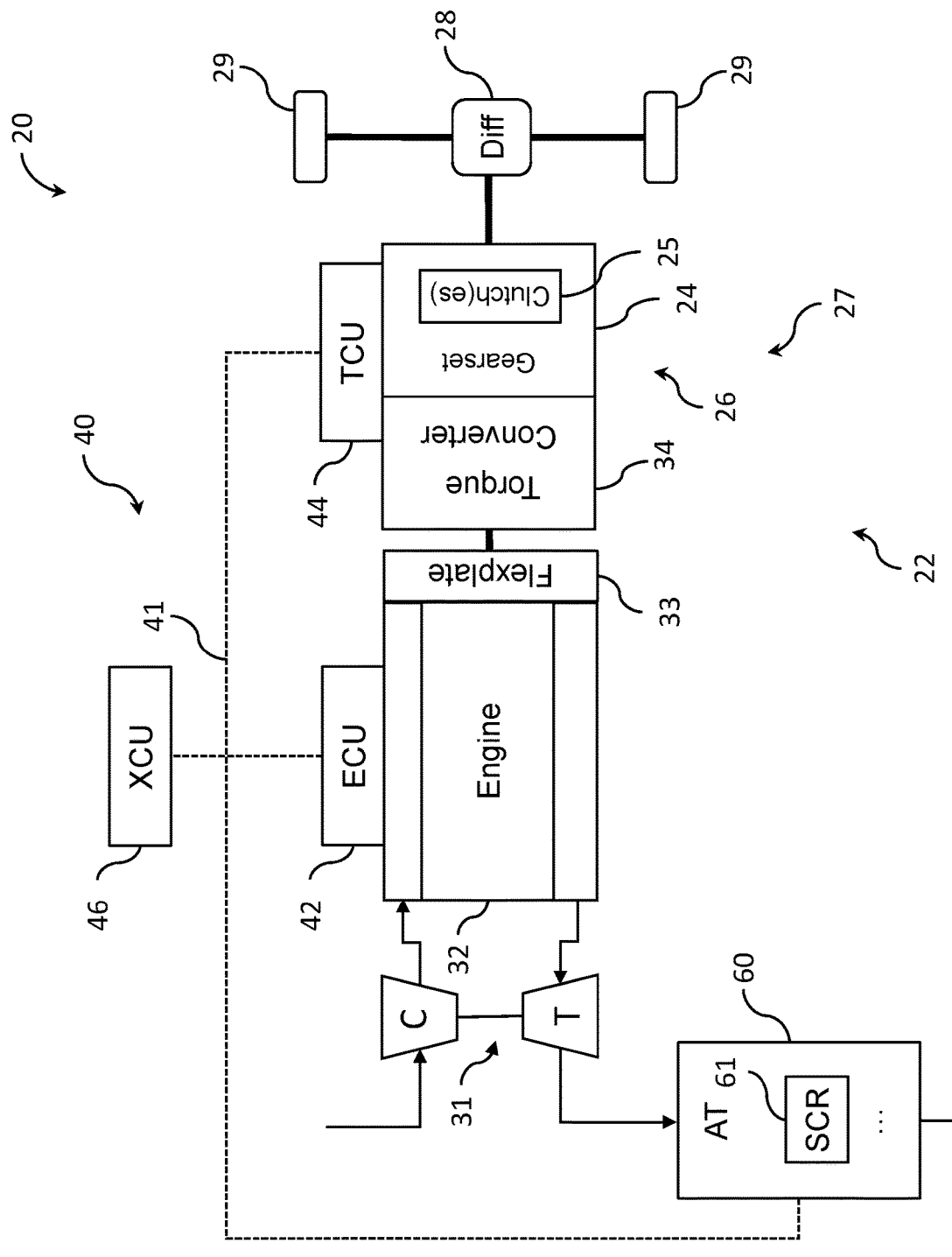
FIG. 1 is a schematic diagram illustrating certain aspects of an example vehicle system.

With reference to FIG. 1, there is illustrated an example vehicle system 20. In the illustrated embodiment, the vehicle system 20 includes a powertrain 22 including an internal combustion engine 32, a flexplate 33, a transmission 26, a differential 28, and ground engaging wheels 29. It shall be appreciated that the flexplate 33, transmission 26, differential 28, and ground engaging wheels 29 may be considered components of a driveline 27 operatively coupled with an output shaft (not shown) of engine 32. In the illustrated embodiment, the vehicle system 20 may be propelled by the ground engaging wheels 29 provided as rear wheels; however, in other embodiments, front-wheel drive, four-wheel drive, and all-wheel drive approaches are contemplated. In one aspect, the vehicle system 20 may be an on-road bus, delivery truck, a service truck, or the like. In other aspects, the vehicle system 20 may be a different type of vehicle, including other types of on-road or off-road vehicles. In still other embodiments, the vehicle system 20 may be another type of vehicle.

The powertrain 22 includes the internal combustion engine 32 operatively coupled with and configured to provide torque to a flexplate 33 which may alternatively be provided as a flywheel. The flexplate 33 may be operatively coupled with and configured to provide torque to a transmission 26. In the illustrated embodiment, the flexplate 33 may be configured to provide torque to torque converter 34 of transmission 26, it being appreciated that other embodiments may not include a torque converter and flexplate (or a flywheel) coupled with the transmission 26. The torque converter 34 may be operatively coupled with and configured to provide torque to clutch 25 which may, in turn, be operatively coupled with and configured to provide torque to gear set 24. The gear set 24 may be configured, for example, as gearbox (e.g., if transmission 26 is configured as a manual transmission or an automated manual transmission), a planetary gear set (e.g., if transmission 26 is configured as an automatic transmission) or as belts or other non-gear forms (e.g., if transmission 26 is configured as continuously variable transmission). The gear set 24 may be operatively coupled with and configured to provide torque to differential 28 which may, in turn, be operatively coupled with and configured to provide torque to the ground engaging wheels 29 or other ground engaging members.

In the illustrated embodiment, the engine 32 is configured as a turbocharged, compression-ignition diesel engine. It shall be appreciated that the engine 32 may be provided as another type of engine in other embodiments. In the illustrated embodiment, the powertrain 22 is powered only by the engine 32. The powertrain 22 may be provided with a turbocharger 31 including a turbine 37 and a compressor 38. The turbine 37 extracts exhaust gas from the engine 32 to drive the compressor 38 to force air back to the engine 32. In other embodiments, the powertrain 22 may be provided with torque from additional components such as an electric motor operatively coupled with a battery or other energy storage system (e.g., in embodiments where the powertrain is configured as a hybrid powertrain), one or more vehicle accessories or other power providing component.

In the illustrated embodiment, the vehicle system 20 may include an exhaust aftertreatment system 60 provided downstream of the engine 32 that injects a liquid-reductant agent through a special catalyst into the exhaust stream of a diesel engine. The exhaust aftertreatment system 60 may include a selective catalyst reduction (SCR) catalyst 61 configured to inject a liquid-reductant agent into the exhaust stream.

The vehicle system 20 includes an electronic control system (ECS) 40 which includes a plurality of control components and structures. The ECS 40 preferably includes one or more programmable microprocessors or microcontrollers of a solid-state, integrated circuit type which are provided in one or more constituent control units of ECS 40. It is also contemplated that the ECS 40 may include other types of integrated circuits and/or discrete circuit control units. In the illustrated embodiment, the ECS 40 includes an engine control unit (ECU) 42, a transmission control unit (TCU) 44, and may also include one or more additional control units (XCU) 46. The ECU 42, TCU 44, and XCU 46 (where present) are operatively coupled with and configured for communication over a network 41 which may be configured as a controller area network (CAN) or another type of network providing communication capabilities. The ECS 40 is also operatively coupled with various components and systems of the vehicle system 20 via network 41 or one or more additional or alternative networks.

The ECS 40 can be implemented in any of a number of ways that combine or distribute the control function across one or more control units in various manners. The ECS 40 executes operating logic that defines various control, management, and/or regulation functions. This operating logic may be in the form of dedicated hardware, such as a hardwired state machine, analog calculating machine, programming instructions, and/or a different form as would occur to those skilled in the art. The ECS 40 may be provided as a single component or a collection of operatively coupled components; and may be comprised of digital circuitry, analog circuitry, or a hybrid combination of both of these types. When of a multi-component form, the ECS 40 may have one or more components remotely located relative to the others in a distributed arrangement. The ECS 40 can include multiple processing units arranged to operate independently, in a pipeline processing arrangement, in a parallel processing arrangement, or the like. It shall be further appreciated that the ECS 40 and/or any of its constituent components may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or components as would occur to those skilled in the art to perform the desired communications.

In the illustrated embodiment, the ECS 40 includes ECU 42 operatively coupled with the powertrain 22 and the exhaust aftertreatment system 60. The ECU 42 may be configured to evaluate an exhaust thermal management metric indicating operation of the system 20 to increase an exhaust aftertreatment temperature using energy that does not contribute to torque output of the engine 32. The ECU 42 is configured to variably control a neutral-at-stop (NAS) operation in response to the exhaust aftertreatment thermal management metric indicating a fuel economy efficiency of the NAS operation.

Figure 2:
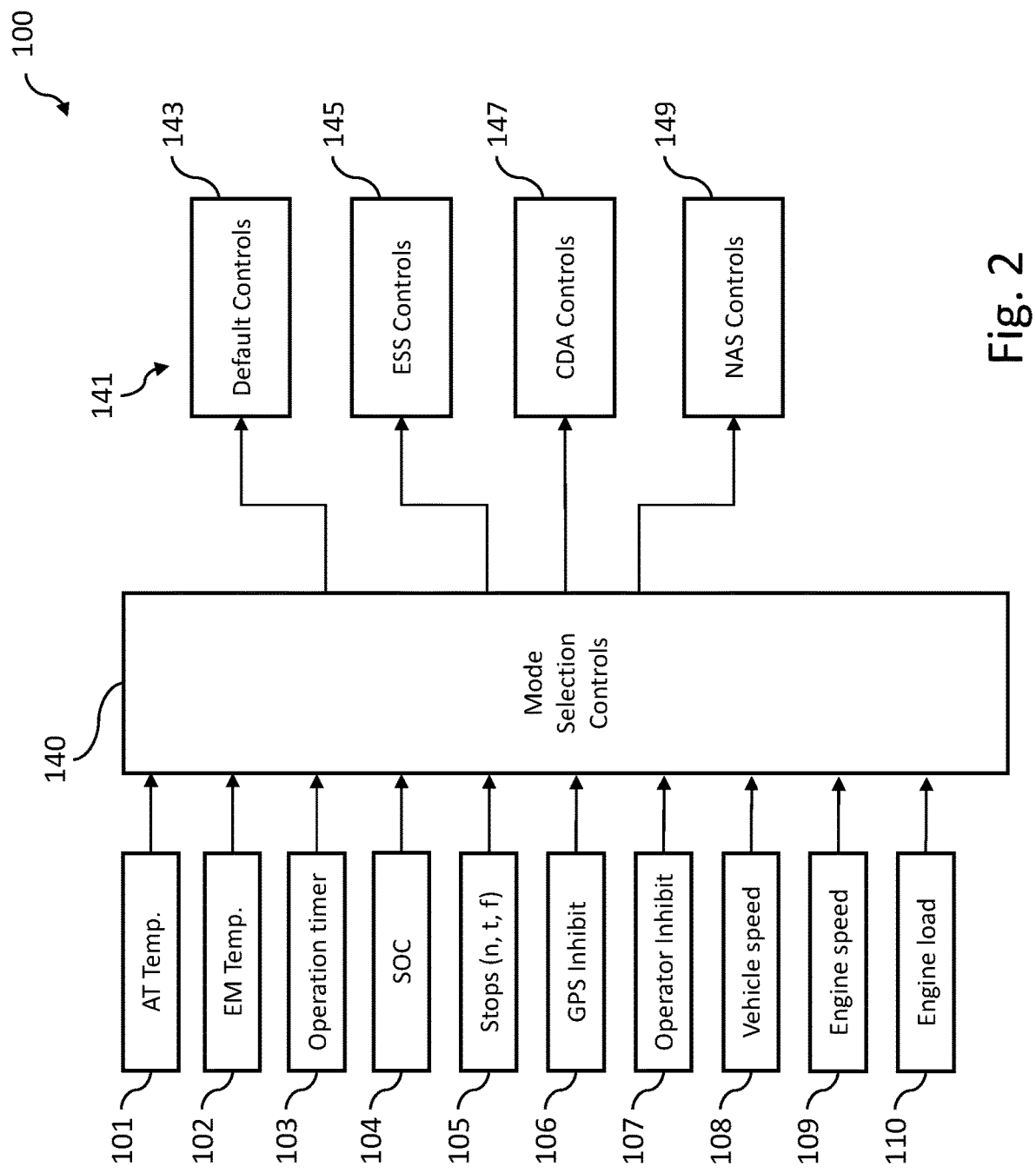
FIG. 2 is a schematic diagram illustrating certain aspects of an example vehicle control system.

With reference to FIG. 2, there is illustrated a schematic diagram depicting certain aspects of example controls 100 which may be implemented in and executed by one or more control components of an electronic control system such as ECS 40 or another electronic control system operatively coupled with and configured to control operation of a vehicle system. Controls 100 include mode selection controls 140 which are configured to receive a plurality of inputs 101-110 and to process one or more of the received inputs to evaluate and select one of a plurality of controls 140 to control a vehicle system such as vehicle system 20.

The plurality of inputs 101-110 include aftertreatment system temperature input 101 (e.g., SCR catalyst temperature, another temperature from which the SCR catalyst temperature can be derived or inferred, or another proxy therefor), exhaust manifold temperature input 102, operation timer input 103 (e.g., time since last vehicle system launch or start), state of charge (SOC) input 104, stops information 105 (e.g., number of stops, stop time, frequency of stops or other information or parameters of vehicle stops), global positioning system (GPS) inhibit input 106, operator inhibit input 107, vehicle speed input 108, engine speed input 109, and engine load input 110.

The plurality of controls 141 include default controls 143, engine start-stop (ESS) controls 145, cylinder deactivation (CDA) controls 147, and neutral at stop (NAS) controls 149. Default controls 143 are configured to operate a vehicle system without utilizing ESS, CDA, or NAS features. ESS controls 145 are configured to operate a vehicle system using one or more ESS control features, for example, control features that evaluate and identify opportunities for stopping a vehicle engine, such as stopped vehicle conditions, and control the vehicle engine to stop operation or shut down under appropriate conditions. In certain forms, the ESS controls 145 may include control logic to optimize or maintain aftertreatment conversion efficiency or functionality. The ESS conditions evaluated by ESS controls may include one or more conditions on measured or predicted aftertreatment temperature. As one example, cold start conditions may be evaluated to disable or suspend ESS for a predetermined operating time, or until an aftertreatment temperature threshold is reached. An evaluation indicating mission segments with frequent stops may also warrant disabling or suspending ESS for a given route segment. More involved ESS conditions may include optimization of a multi-objective cost function to simultaneously optimize for fuel efficiency and aftertreatment conversion efficiency.

CDA controls 147 are configured to operate a vehicle system using one or more CDA control features, for example, control features that evaluate and identify opportunities for deactivating one or more cylinders of a vehicle engine, such as a vehicle operating under a light load and/or under which a desired exhaust aftertreatment system temperature is maintained, and control the vehicle engine to operate with one or more cylinders deactivated under appropriate conditions.

NAS controls 149 are configured to operate a vehicle system using one or more NAS control features, for example, control features that evaluate and identify opportunities for decoupling an engine from one or more downstream driveline components, such as a stopped vehicle and/or under a vehicle operating such that a desired exhaust aftertreatment system temperature is maintained, and control the vehicle decoupled the engine from one or more downstream driveline components under appropriate conditions.

Figure 3:
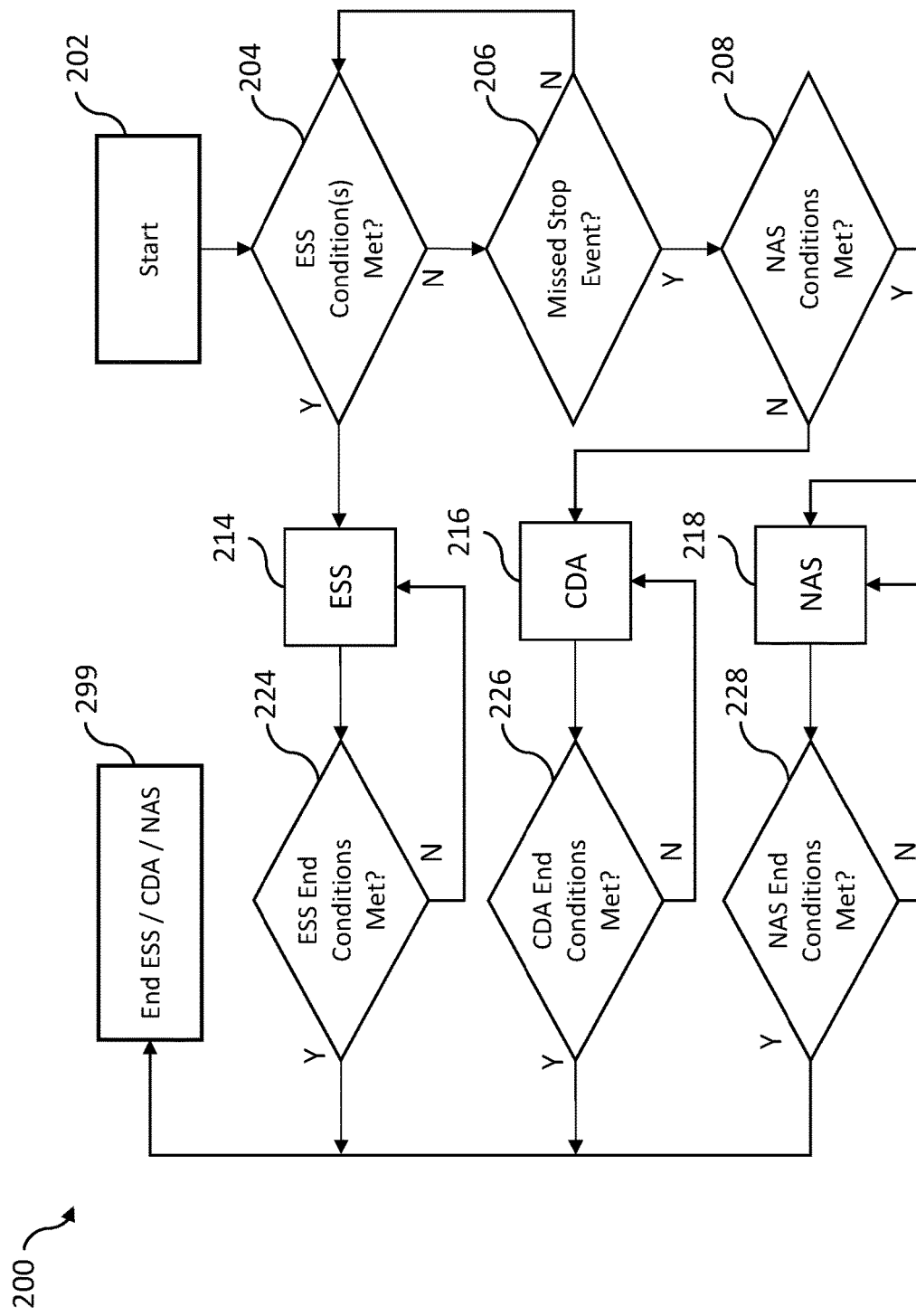
FIG. 3 is a flowchart illustrating certain aspects of an example control process.

With reference to FIG. 3, there is illustrated an example process 200 which may be implemented and performed by controls of an electronic control system such as controls 140 or other controls of an electronic control system operatively coupled with a vehicle system including an engine. Process 200 may be called or otherwise initiated at start operation 202. From start operation 202, process 200 proceeds to operation 204 which evaluates one or more ESS conditions are met. The ESS conditions may comprise, for example, one or more conditions or criteria for operating a vehicle system using engine start-stop controls such as ESS controls 145 or other ESS controls.

If conditional 204 evaluates that the one or more ESS conditions are met, process 200 proceeds to operation 214 which initiates or selects an ESS operating mode that controls the vehicle system using ESS controls. From operation 214, process 200 proceeds to conditional 224 which evaluates whether one or more ESS end conditions are met. The one or more ESS end conditions may comprise, for example, one or more conditions or criteria for ending, suspending, pausing, or terminating use of ESS controls in controlling operation of the vehicle system.

If conditional 224 evaluates that one or more ESS end conditions are not met, process 200 returns to operation 214 and proceeds as described above. If conditional 224 evaluates that the one or more ESS end conditions are met, process 200 proceeds to operation 299 which ends or terminates operation of the ESS controls.

If conditional 204 evaluates that the one or more ESS conditions are not met, the process 200 proceeds to conditional 206 which evaluates one or more missed-stop conditions for indicating a missed-stop event. The one or more missed-stop conditions may be evaluated, for example, in accordance with process 301 which is illustrated and described herein below in connection with FIG. 4.

If conditional 206 evaluates that the one or more missed-stop conditions do not indicate a missed stop event, process 200 returns to conditional 204 and proceeds as described above. If conditional 206 evaluates that the one or more missed-stop conditions indicate a missed stop event, process 200 proceeds to conditional 208.

Conditional 208 evaluates one or more NAS conditions for operating the vehicle system using neutral-at-stop (NAS) controls. The NAS conditions may comprise, for example, one or more conditions or criteria for operating a vehicle system using engine neutral-at-stop controls such as NAS controls 149 or other NAS controls. The one or more NAS conditions may be evaluated, for example, in accordance with process 302 which is illustrated and described herein below.

If conditional 208 evaluates that the one or more NAS conditions are met, process 200 proceeds to operation 218 which initiates or selects a NAS operating mode that controls the vehicle system using NAS controls. From operation 218, process 200 proceeds to conditional 228 which evaluates whether one or more NAS end conditions are met. The one or more NAS end conditions may comprise, for example, one or more conditions or criteria for ending, suspending, pausing, or terminating use of NAS controls in controlling operation of the vehicle system.

If conditional 228 evaluates that one or more NAS end conditions are not met, process 200 returns to operation 218 and proceeds as described above. If conditional 228 evaluates that the one or more ESS end conditions are met, process 200 proceeds to operation 299 which ends or terminates operation of the NAS controls.

If conditional 208 evaluates that the one or more NAS conditions are not met, process 200 proceeds to operation 216 which initiates or selects a CDA operating mode that controls the vehicle system using CDA controls. From operation 216, process 200 proceeds to conditional 226 which evaluates whether one or more CDA end conditions are met. The one or more CDA end conditions may comprise, for example, one or more conditions or criteria for ending, suspending, pausing, or terminating use of CDA control is controlling operation of a vehicle system.

If conditional 226 evaluates that the one or more CDA end conditions are not met, process 200 returns to operation 216 and proceeds as described above. If conditional 226 evaluates that the one or more ESS end conditions are met, process 200 proceeds to operation 299 which ends or terminates operation of the CDA controls.

Figure 4:
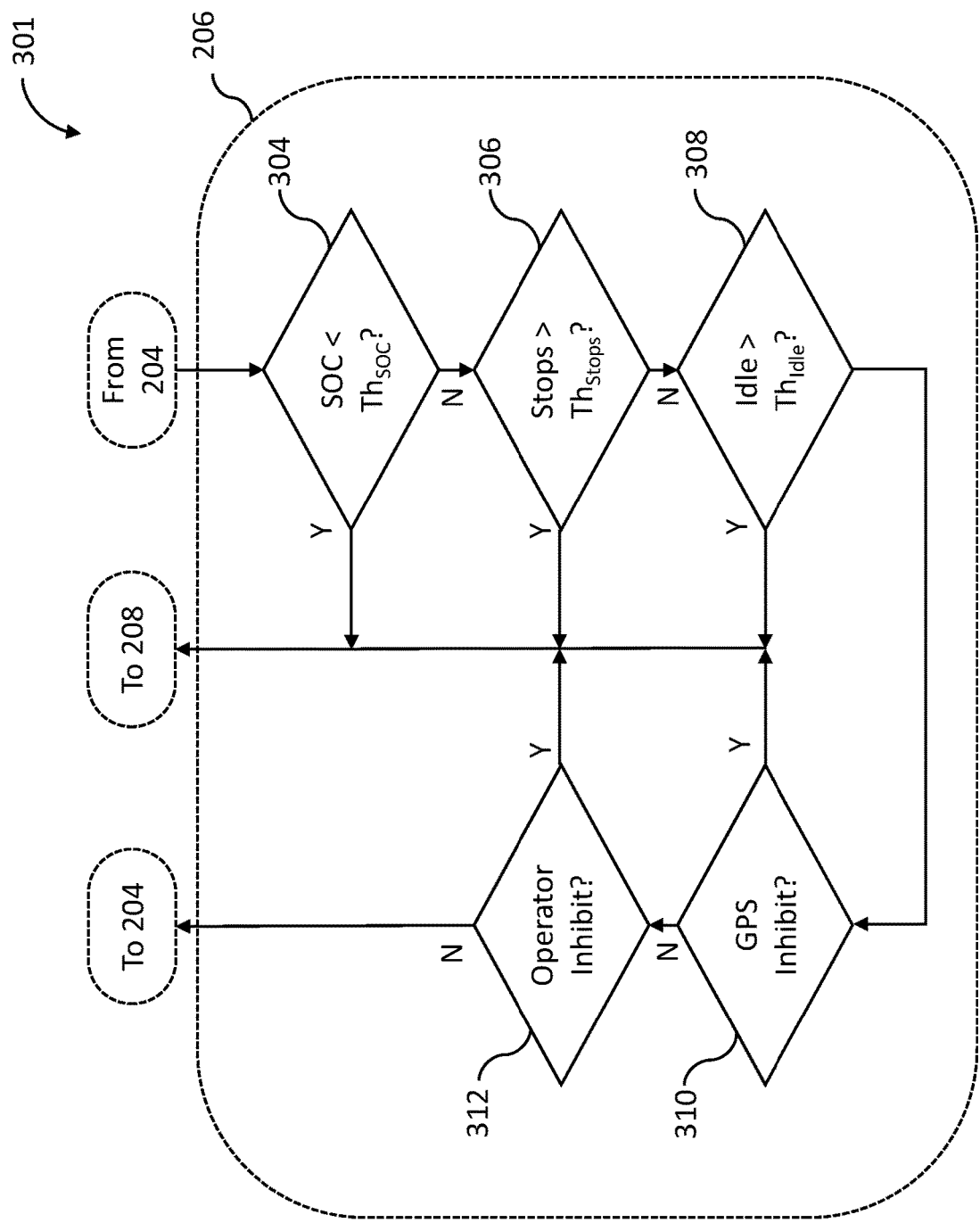
FIG. 4 is a flowchart illustrating certain aspects of an example control process.

With reference to FIG. 4, there is illustrated an example process 301 which may be implemented and performed by conditional 206 of process 200 or, in other embodiments, by other processes and other controls of an electronic control system operatively coupled with a vehicle system including an engine. Thus, while process 301 is described in connection with conditional 206 and other aspects and features of process 200, it shall be appreciated that process 301 may be implemented and performed in connection with other processes and controls of an electronic control system operatively coupled with a vehicle system including an engine. For example, process 301 may be initiated by process 200 proceeding from conditional 204 to conditional 206 or, in other embodiments, by other operations of other processes and controls of an electronic control system operatively coupled with a vehicle system including an engine. It shall likewise be appreciated that the references to other aspects and features of process 200 may, in other embodiments, be taken to refer and relate to features of other processes and other controls. It shall also be appreciated that various evaluations and other aspects of process 301 may be omitted in certain embodiments.

After initiation, process 301 proceeds to conditional 304 which evaluates an SOC value to at least one SOC criterion. The SOC value may comprise, for example, an SOC value determined or received as input by one or more controls of an electronic control system. The at least one SOC criterion may include, for example, an SOC threshold such as a threshold established for a battery or other energy storage system (e.g., in embodiments including a hybrid powertrain). If conditional 304 evaluates that the at least one SOC criterion is satisfied, process 301 proceeds to conditional 208. If conditional 304 evaluates that the at least one SOC criterion is not satisfied, process 301 proceeds to conditional 306. It shall also be appreciated that conditional 304 may be omitted in certain embodiments which lack a battery or other energy storage system suitable for evaluation by conditional 204.

Conditional 306 evaluates a number of stops value relative to at least one number of stops criterion. The number of stops value may comprise, for example, a number of stops determined or received as input by one or more controls of an electronic control system. The at least one number of stops criterion may comprise, for example, a number of stops threshold. If conditional 306 evaluates that the at least one number of stops criterion is satisfied, process 301 proceeds to conditional 208. If conditional 304 evaluates that the at least one number of stops criterion is not satisfied, process 301 proceeds to conditional 308.

Conditional 308 evaluates an idle operation value relative to at least one idle operation criterion. The idle operation value may comprise, for example, an idle operation count, duration, or time determined or received as input by one or more controls of an electronic control system. The at least one idle operation criterion may comprise an idle operation threshold. If conditional 308 evaluates that the least one idle operation criterion is satisfied, process 301 proceeds to conditional 208. If conditional 304 evaluates that the least one idle operation criterion is not satisfied, process 301 proceeds to conditional 310.

Conditional 310 evaluates a GPS inhibit condition, for example, the status of a GPS inhibit flag, message, or other signal from a GPS system. If conditional 310 evaluates that the GPS inhibit condition is satisfied, process 301 proceeds to conditional 208. If conditional 310 evaluates that the GPS inhibit condition is satisfied, process 301 proceeds to conditional 312. It shall also be appreciated that conditional 310 may be omitted in certain embodiments which lack GPS system suitable for evaluation by conditional 310.

Conditional 312 evaluates an operator inhibit condition, for example, the status of an operator inhibit flag, message, or other signal from an input device actuated by a system operator. If conditional 310 evaluates that the operator inhibit condition is satisfied, process 301 proceeds to conditional 208. If conditional 310 evaluates that the operator inhibit condition is satisfied, process 301 proceeds to conditional 312.

Figure 5:
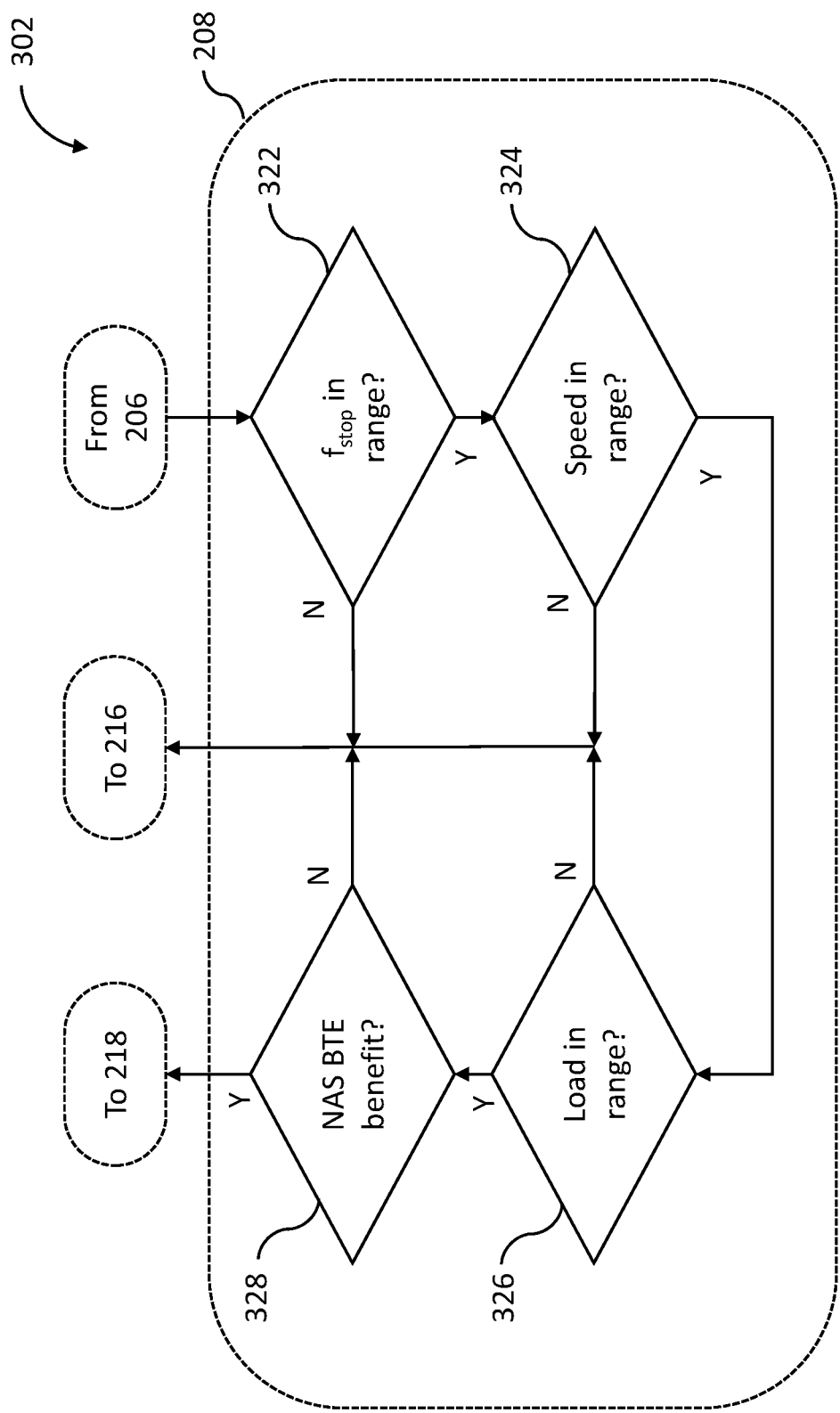
FIG. 5 is a flowchart illustrating certain aspects of an example control process.

With reference to FIG. 5, there is illustrated an example process 302 which may be implemented and performed by conditional 208 of process 200 or, in other embodiments, by other processes and other controls of an electronic control system operatively coupled with a vehicle system including an engine. Thus, while process 302 is described in connection with conditional 208 and other aspects and features of process 200, it shall be appreciated that process 302 may be implemented and performed in connection with other processes and controls of an electronic control system operatively coupled with a vehicle system including an engine. For example, process 302 may be initiated by process 200 proceeding from conditional 206 to conditional 208 or, in other embodiments, by other operations of other processes and controls of an electronic control system operatively coupled with a vehicle system including an engine. It shall likewise be appreciated that the references to other aspects and features of process 200 may, in other embodiments, be taken to refer and relate to features of other processes and other controls.

After initiation, process 302 proceeds to conditional 322 which evaluates a stop frequency value relative to at least one stop frequency criterion. The stop frequency value may comprise, for example, a stop frequency value determined or received as input by one or more controls of an electronic control system. The at least one stop frequency criterion may include, for example, one or more stop frequency thresholds or ranges. If conditional 322 evaluates that the at least one stop frequency criterion is not satisfied, process 302 proceeds to conditional 216. If conditional 322 evaluates that the at least one stop frequency criterion is satisfied, process 302 proceeds to conditional 324.

Conditional 324 evaluates a vehicle speed value relative to at least one vehicle speed criterion. The vehicle speed value may comprise, for example, a vehicle speed value determined or received as input by one or more controls of an electronic control system. The at least one vehicle speed criterion may include, for example, one or more vehicle speed thresholds or ranges. If conditional 324 evaluates that the at least one vehicle speed criterion is not satisfied, process 302 proceeds to conditional 216. If conditional 324 evaluates that the at least one vehicle speed criterion is satisfied, process 302 proceeds to conditional 326.

Conditional 326 evaluates a powertrain load value relative to at least one powertrain load criterion. The powertrain load value may comprise, for example, a powertrain load value determined or received as input by one or more controls of an electronic control system. at least one powertrain load criterion may include, for example, one or more powertrain load thresholds or ranges. If conditional 326 evaluates that the at least one powertrain load criterion is not satisfied, process 302 proceeds to conditional 216. If conditional 326 evaluates that the at least one powertrain load criterion is satisfied, process 301 proceeds to conditional 328.

Conditional 328 evaluates a NAS efficiency benefit value relative to at least one NAS efficiency benefit criterion. The NAS efficiency benefit value may comprise, for example, a NAS efficiency value, such as a NAS brake thermal efficiency (BTE) value, calculated, modeled, or otherwise determined or received as input by one or more controls of an electronic control system. The NAS efficiency benefit value may include, for example, one or more NAS efficiency value thresholds or ranges. In some embodiment, the NAS efficiency benefit value and the at least one NAS efficiency benefit criterion may be adapted, configured, implemented, and/or provided in accordance with the techniques disclosed in U.S. Application No. 63/026,244 filed on May 18, 2020, the disclosure of which is hereby incorporated by reference. If conditional 328 evaluates that the at least one NAS efficiency benefit condition is not true, process 302 proceeds to conditional 216. If conditional 328 evaluates that the at least one NAS efficiency benefit condition is true, process 301 proceeds to conditional 218.

While example embodiments of the disclosure have been illustrated and described in detail in the drawings and foregoing description, the same is to be considered as illustrative and not restrictive in character, it being understood that only certain example embodiments have been shown and described and that all changes and modifications that come within the spirit of the claimed inventions are desired to be protected. It should be understood that while the use of words such as preferable, preferably, preferred, or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

The invention claimed is:

1. A method of operating an electronic control system to control operation of a vehicle system including an internal combustion engine, the method comprising:
   evaluating a plurality of engine start-stop conditions for operating the vehicle system using engine start-stop controls;
   controlling the vehicle system using the engine start-stop controls in response to the plurality of engine start-stop conditions being met;
   in response to a missed stop event resulting from the plurality of engine start-stop conditions not being met determining whether the missed stop event is attributable to at least one of a subset of the plurality of engine start-stop conditions, the subset comprising fewer than all of the plurality of engine start-stop conditions;
   repeating the evaluating the plurality of engine start-stop conditions in response to the determining indicating that the missed stop event is not attributable to at least one of the subset of the plurality of engine start-stop conditions;
evaluating one or more neutral-at-stop conditions for operating the vehicle system using neutral-at-stop controls in response to the determining indicating that the missed stop event is attributable to at least one of the subset of the plurality of engine start-stop conditions;
controlling the vehicle system using the neutral-at-stop controls in response to the one or more neutral-at-stop conditions being met; and
controlling the vehicle system using cylinder deactivation controls in response to the one or more neutral-at-stop conditions not being met.

2. The method of claim 1, wherein the evaluating the plurality of engine start-stop conditions includes evaluating of a measured aftertreatment temperature, a predicted operating temperature, a cold start operating condition, a mission segment stopping frequency or duration, and an optimization of fuel efficiency and aftertreatment conversion efficiency.

3. The method of claim 2, wherein the determining includes one or more of:
evaluating a state of charge value relative to at least one state of charge criterion,
evaluating a number of stops value relative to at least one number of stops criterion,
evaluating an idle operation value relative to at least one idle operation criterion,
evaluating a GPS inhibit condition, and
evaluating an operator inhibit condition.

4. The method of claim 3, wherein one or more of:
the at least one state of charge criterion includes a state of charge threshold,
the at least one number of stops criterion includes a number of stops threshold, and
the at least one idle operation criterion includes an idle operation threshold.

5. The method of claim 1, wherein the evaluating one or more neutral-at-stop conditions includes one or more of:
evaluating a stop frequency value relative to at least one stop frequency criterion,
evaluating a vehicle speed value relative to at least one vehicle speed criterion,
evaluating a powertrain load value relative to at least one powertrain load criterion, and
evaluating a neutral-at-stop efficiency benefit value relative to at least one neutral-at-stop efficiency benefit criterion.

6. The method of claim 5, wherein one or more of:
the at least one stop frequency criterion includes a stop frequency range;
the at least one vehicle speed criterion includes a vehicle speed range,
the at least one powertrain load criterion includes a powertrain load range, and
the at least one neutral-at-stop efficiency benefit includes a brake thermal efficiency benefit.

7. An electronic control system to control operation of a vehicle system including an internal combustion engine, the electronic control system comprising:
an integrated circuit-based controller and one or more non-transitory controller readable memory media storing instructions executable by the integrated circuit-based controller to:
evaluate a plurality of engine start-stop conditions for operating the vehicle system using engine start-stop controls;
control the vehicle system using the engine start-stop controls in response to the one or plurality of engine start-stop conditions being met;
in response to the plurality of engine start-stop conditions not being met one of: (a) repeat the evaluation of the plurality of engine start-stop conditions if the plurality of engine start-stop conditions not being met is due to a subset of the plurality of engine start-stop conditions not being met, the subset comprising some but not all of the plurality of engine start-stop conditions, and (b) evaluate one or more neutral-at-stop conditions for operating the vehicle system using neutral-at-stop controls if the plurality of engine start-stop conditions not being met is not due to at least one of the subset of the plurality of engine start-stop conditions not being met;
control the vehicle system using the neutral-at-stop controls in response to the one or more neutral-at-stop conditions being met; and
control the vehicle system using cylinder deactivation controls in response to the one or more neutral-at-stop conditions not being met.

8. The electronic control system of claim 7, wherein the one or more plurality of engine start-stop conditions include one or more of a measured aftertreatment temperature, a predicted operating temperature, a cold start operating condition, a mission segment stopping frequency or duration, and an optimization of fuel efficiency and aftertreatment conversion efficiency.

9. The electronic control system of claim 7, wherein the subset of the plurality of engine start-stop conditions comprises:
a state of charge value evaluated relative to at least one state of charge criterion,
a number of stops value evaluated relative to at least one number of stops criterion,
an idle operation value evaluated relative to at least one idle operation criterion,
a GPS inhibit condition, and
an operator inhibit condition.

10. The electronic control system of claim 9, wherein one or more of:
the at least one state of charge criterion includes a state of charge threshold,
the at least one number of stops criterion includes a number of stops threshold, and
the at least one idle operation criterion includes an idle operation threshold.

11. The electronic control system of claim 7, wherein the one or more neutral-at-stop conditions includes one or more of:
a stop frequency value relative to at least one stop frequency criterion,
a vehicle speed value relative to at least one vehicle speed criterion,
a powertrain load value relative to at least one powertrain load criterion, and
a neutral-at-stop efficiency benefit value relative to at least one neutral-at-stop efficiency benefit criterion.

12. The electronic control system of claim 11, wherein one or more of:
the at least one stop frequency criterion includes a stop frequency range;

the at least one vehicle speed criterion includes a vehicle speed range, the at least one powertrain load criterion includes a powertrain load range, and the at least one neutral-at-stop efficiency benefit includes a brake thermal efficiency benefit.

13. An apparatus comprising:

a non-transitory memory medium configured with instructions executable by an electronic controller to perform acts of:

evaluating a plurality of engine start-stop conditions for operating a vehicle system using engine start-stop controls;

controlling the vehicle system using the engine start-stop controls in response to the the plurality of engine start-stop conditions being met plurality of engine start-stop conditions being met;

in response to the plurality of engine start-stop conditions not being met one of: (a) repeating the act of evaluating the plurality of engine start-stop conditions if the plurality of engine start-stop conditions not being met includes at least one of a subset of the plurality of engine start-stop conditions not being met, the subset comprising some but not all of the plurality of engine start-stop conditions, and (b) evaluating one or more neutral-at-stop conditions for operating the vehicle system using neutral-at-stop controls if the plurality of engine start-stop conditions not being met does not include at least one of the subset of the plurality of engine start-stop conditions not being met;

controlling the vehicle system using the neutral-at-stop controls in response to the one or more neutral-at-stop conditions being met; and controlling the vehicle system using cylinder deactivation controls in response to the one or more neutral-at-stop conditions not being met.

14. The apparatus of claim 13, wherein the a plurality of engine start-stop conditions include a measured aftertreatment temperature, a predicted operating temperature, a cold start operating condition, a mission segment stopping frequency or duration, and an optimization of fuel efficiency and aftertreatment conversion efficiency.

15. The apparatus of claim 13, wherein the subset of the plurality of engine start-stop conditions comprises:

a number of stops value evaluated relative to at least one number of stops criterion, an idle operation value evaluated relative to at least one idle operation criterion, and an operator inhibit condition.

16. The apparatus of claim 13, wherein the one or more neutral-at-stop conditions include:

a stop frequency value relative to at least one stop frequency criterion, a vehicle speed value relative to at least one vehicle speed criterion, a powertrain load value relative to at least one powertrain load criterion, and a neutral-at-stop efficiency benefit value relative to at least one neutral-at-stop efficiency benefit criterion.

17. The apparatus of claim 16, wherein the at least one stop frequency criterion includes a stop frequency range.

18. The apparatus of claim 16, wherein the at least one vehicle speed criterion includes a vehicle speed range.

19. The apparatus of claim 16, wherein the at least one powertrain load criterion includes a powertrain load range.

20. The apparatus of claim 16, wherein the at least one neutral-at-stop efficiency benefit includes a brake thermal efficiency benefit.

* * * * *